US008768906B2

(12) United States Patent
Pan et al.

(10) Patent No.: US 8,768,906 B2
(45) Date of Patent: Jul. 1, 2014

(54) METHOD AND SYSTEM OF DISPLAYING RELATED KEYWORDS

(75) Inventors: Lei Pan, Zhejiang (CN); Yuanhu Yao, Hangzhou (CN); Weiwei Wang, Hangzhou (CN); Yu Zhang, Hangzhou (JP)

(73) Assignee: Alibaba Group Holding Limited, Grand Cayman (KY)

(*) Notice: Subject to any disclaimer, the term of this patent is extended or adjusted under 35 U.S.C. 154(b) by 511 days.

(21) Appl. No.: 12/532,986

(22) PCT Filed: Aug. 28, 2007

(86) PCT No.: PCT/CN2007/070571
§ 371 (c)(1),
(2), (4) Date: Nov. 6, 2009

(87) PCT Pub. No.: WO2008/116366
PCT Pub. Date: Oct. 2, 2008

(65) Prior Publication Data
US 2010/0076995 A1 Mar. 25, 2010

(51) Int. Cl.
*G06F 7/00* (2006.01)
*G06F 17/30* (2006.01)

(52) U.S. Cl.
USPC ............................ 707/705; 707/706; 707/711

(58) Field of Classification Search
USPC ...................... 707/999.003, 999.006, 999.01, 707/705–708, 711, 944
See application file for complete search history.

(56) References Cited

U.S. PATENT DOCUMENTS 6,169,986 B1 * 1/2001 Bowman et al. ...................... 1/1
6,751,613 B1 * 6/2004 Lee et al. ............................... 1/1
7,191,177 B2 * 3/2007 Konaka ........................... 707/758
7,428,529 B2 * 9/2008 Zeng et al. ............................ 1/1

(Continued)

FOREIGN PATENT DOCUMENTS

CN 1909522 A 2/2007
EP 1587011 A1 10/2005

(Continued)

OTHER PUBLICATIONS

Chinese Office Action mailed Sep. 18, 2009 for Chinese patent application No. 2007100888164 a counterpart foreing application of U.S. Appl. No. 12/532,986, 79 pages.

(Continued)

*Primary Examiner* — Robert Beausoliel, Jr.
*Assistant Examiner* — Susan F Rayyan
(74) *Attorney, Agent, or Firm* — Lee & Hayes, PLLC

(57) ABSTRACT

A method and a system of displaying related keywords are provided. The method includes: receiving a primary keyword inputted by a user and a request for retrieving keywords related to the primary keyword; recording a frequency of the retrieving request corresponding to the primary keyword; selecting a candidate group of related keywords based on the frequency from the groups of related keywords corresponding to the primary keyword; and displaying the related keywords in the candidate group of related keywords. The system includes: an interface unit, a recording unit, an acquiring unit and a displaying unit. The disclosed method and system retrieve different groups of related keywords based on the frequency of the request for retrieving keywords related to a certain primary keyword, and display the retrieved related keywords in a rotating manner and allow a user to obtain the related keywords in an easier and more complete way.

20 Claims, 5 Drawing Sheets

(56) References Cited

U.S. PATENT DOCUMENTS

| | | | |
|---|---|---|---|
| 7,587,385 B2 * | 9/2009 | Vayssiere | 1/1 |
| 7,689,585 B2 * | 3/2010 | Zeng et al. | 707/999.104 |
| 7,756,855 B2 * | 7/2010 | Ismalon | 707/713 |
| 7,792,967 B2 * | 9/2010 | Jones et al. | 709/226 |
| 2002/0120712 A1 * | 8/2002 | Maislin | 709/217 |
| 2002/0152204 A1 | 10/2002 | Ortega et al. | |
| 2003/0037050 A1 | 2/2003 | Monteverde | |
| 2004/0249790 A1 | 12/2004 | Komamura | |
| 2005/0071325 A1 | 3/2005 | Bem | |
| 2005/0071332 A1 | 3/2005 | Ortega et al. | |
| 2005/0108210 A1 | 5/2005 | Wang et al. | |
| 2005/0198068 A1 * | 9/2005 | Mukherjee et al. | 707/104.1 |
| 2005/0234879 A1 | 10/2005 | Zeng et al. | |
| 2006/0117003 A1 | 6/2006 | Ortega et al. | |
| 2006/0230015 A1 * | 10/2006 | Gupta | 707/1 |
| 2007/0027865 A1 | 2/2007 | Bartz et al. | |
| 2007/0050335 A1 | 3/2007 | Kashima et al. | |
| 2007/0100804 A1 | 5/2007 | Cava | |
| 2007/0214128 A1 | 9/2007 | Smith et al. | |
| 2007/0282811 A1 | 12/2007 | Musgrove | |
| 2008/0010269 A1 | 1/2008 | Parikh | |
| 2008/0104050 A1 * | 5/2008 | Kehl | 707/5 |
| 2008/0256055 A1 | 10/2008 | Cloward | |
| 2009/0063461 A1 | 3/2009 | Wang et al. | |

FOREIGN PATENT DOCUMENTS

| | | |
|---|---|---|
| JP | 11053380 A | 2/1999 |
| JP | H11250086 A | 9/1999 |
| JP | 2002007450 A | 1/2002 |
| JP | 2002092032 A | 3/2002 |
| JP | 2002215659 A | 8/2002 |
| JP | 2004185220 A | 7/2004 |
| JP | 2004362599 A | 12/2004 |
| JP | 2005310094 A | 11/2005 |
| JP | 2007052731 A | 3/2007 |
| WO | WO9948028 A2 | 9/1999 |
| WO | WO2006113506 A2 | 10/2006 |

OTHER PUBLICATIONS

Translated Japanese Office Action mailed Jul. 20, 2012 for Japanese patent application No. 2010-500050, a counterpart foreign application of U.S. Appl. No. 12/532,986, 8 pages.

Translated Japanese Office Action mailed Feb. 12, 2014 for Japanese patent application No. 2013-060165, a counterpart foreign application of U.S. Appl. No. 12/532,986, 7 pages.

* cited by examiner

METHOD AND SYSTEM OF DISPLAYING RELATED KEYWORDS

This application claims priority from Chinese Patent Application No. 200710088816.4, filed at China Patent Office on Mar. 28, 2007, entitled "METHOD AND SYSTEM OF DISPLAYING RELATED KEYWORDS", and incorporates the Chinese patent application in its entirety by reference.

TECHNICAL FIELD

The present invention relates to a field of information search, and particularly relates to methods and systems of displaying related keywords.

BACKGROUND ART

Along with the rapid increase of textual and multimedia contents on the Internet and other data networks and systems, a user has become increasingly dependent on keyword-based search tools to find required information. A user normally enters a keyword of an inquired document into a search tool or search engine, which then performs a search in an indexed database and returns a search result. Generally, existing search tools or search engines may further display, on a current result page, one or more keywords related to the user input keyword (i.e., the primary keyword).

Generally, the following two methods are used in existing technologies to display related keywords.

1. A fixed number of related keywords are displayed according to a static display of the primary keyword.

According to this method, the number of user-selectable related keywords is fixed. For example, Google only displays ten keywords related to a primary keyword on a result page. In practice, a large number of related keywords may be obtained based on the primary keyword. The search methods that have a limited number of related keywords cannot satisfy the needs of a user and two provide effective hints to the user, and result in a poor user experience.

2. An offer for a further search for related keywords is displayed.

According to this method, a further search using related keywords which are not displayed on a current result page is offered. The display of related keywords on Baidu.com is an example. Upon displaying nine keywords related to a primary keyword, an option of "more relevant search" is provided. A user can perform a further search for all related keywords by clicking the links, and go to web page(s) displaying the related keywords. Evidently, this way of displaying related keywords requires a user to go through a number of steps and has complicated operations, and thus do not conform to the habits of the user.

As a result, there is a pressing need for those skilled in the art to obtain related keywords for a user in a simple and comprehensive manner.

DESCRIPTION OF THE INVENTION

The present invention aims to provide a method and a system of displaying related keywords so that a user can obtain the related keywords in a simple and comprehensive manner.

In order to do this, exemplary embodiments of the present invention discloses a method of displaying related keywords. The method includes the following procedure:

receive a primary keyword inputted by a user and a request for retrieving keywords related to the primary keyword;

record a frequency of the retrieving request corresponding to the primary keyword;

select a candidate group of related keywords based on the frequency from the groups of related keywords corresponding to the primary keyword; and display related keywords in the candidate group of related keywords.

Preferably, the groups of related keywords of the primary keyword are stored in a cache of a server end.

Preferably, the groups of related keywords of the primary keyword are stored in the cache of the server end using the following procedure:

extract keywords related to the primary keyword from a database; and group the related keywords to generate the groups of related keywords, and storing the groups of related keywords into the cache.

Preferably, the groups of related keywords of the primary keyword are stored in the cache of the server end using the following procedure:

obtain keywords related to the primary keyword;

group the related keywords to generate the groups of related keywords, and storing the groups of related keywords into a database; and extract the groups of related keywords corresponding to the primary keyword from the database, and storing the groups of related keywords into the cache.

Preferably, the frequency of the request is recorded using the following procedure:

create a table for each keyword, and store the frequency of the retrieving request corresponding to the primary keyword in a position in the table pairing with the primary keyword; and find a matching keyword according to the retrieving request, obtain the frequency of the retrieving request in the position pairing with the primary keyword in the respective table, and add one to the frequency of the retrieving request corresponding to the primary keyword.

Preferably, the tables are stored in the cache of the server end.

Preferably, the groups of related keywords are generated using the following procedure:

determine fixed keywords and rotating keywords from the related keywords; and establish at least one group of related keywords based on the primary keyword in advance and add the fixed keywords and the rotating keywords into the at least one group of related keywords.

Preferably, the fixed keywords and the rotating keywords are determined using the following procedure:

obtain a level of correlation between the primary keyword and each related keywords;

count the related keywords whose level of correlation is above or at a certain threshold to be fixed keywords; and count the related keywords whose level of correlation is lower than the certain threshold to be rotating keywords.

The exemplary embodiments of the present invention further provide a system of displaying related keywords. The system includes:

an interface unit, used for receiving a primary keyword inputted by a user and a request for retrieving keywords related to the primary keyword;

a recording unit, used for recording a frequency of the request corresponding to the primary keyword;

an acquiring unit, used for selecting a candidate group of related keywords based on the frequency from the groups of related keywords corresponding to the primary keyword; and a displaying unit, used for displaying related keywords in the candidate group of related keywords.

Preferably, the system may further include: a storage unit, used for storing the groups of related keywords corresponding to the primary keyword.

Preferably, the system may further include:

a database, used for storing the primary keyword and the corresponding related keywords;

a keyword retrieving unit, used for retrieving the keywords related to the primary keyword from the database; and a grouping unit, used for grouping the related keywords to generate the groups of related keywords.

Preferably, the system may further include:

a database, used for storing the primary keyword and the groups of corresponding related keywords; and a group retrieving unit, used for retrieving the groups of related keywords corresponding to the primary keyword from the database.

Preferably, the recording unit may include:

a creation sub-unit, used for creating a table for each keyword and storing the frequency of the request corresponding to the primary keyword in a position pairing with the primary keyword; and a recording sub-unit, used for finding a matching keyword according to the retrieving request, obtaining the frequency of the retrieving request in the position pairing with the primary keyword in the respective table, and adding a value of one to the frequency of the retrieving request corresponding to the primary keyword.

More preferably, the tables are stored in a cache of a server end.

As illustrated from the above technical scheme, the exemplary embodiments of the present invention select a different group of related keywords based on the frequency of the request for retrieving keywords related to a certain primary keyword and display the selected related keywords in a rotating manner. This allows a user to obtain the related keywords in an easier and more complete way without any additional operations.

EXEMPLARY EMBODIMENTS

In order to help more clearly and easily understand goals, characteristics and advantages of the present invention, the present invention is described in further detail below using accompanying figures and specific embodiments.

The exemplary embodiments of the present invention extract a frequency of a request for retrieving keywords related to a primary keyword and obtain corresponding groups of related keywords, thus allowing the related keywords to be displayed in a completely round robin manner.

Figure 1:
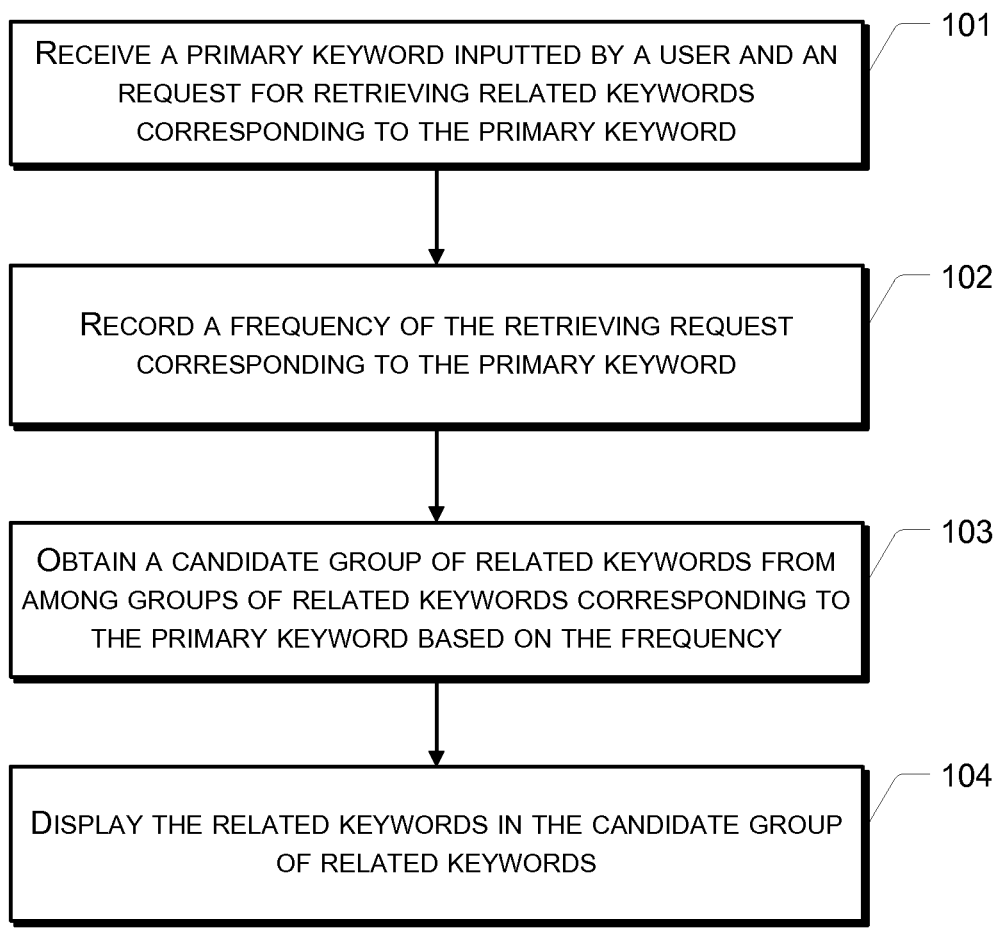
FIG. 1 shows a flow chart illustrating a method of displaying related keywords in accordance with the present invention.

FIG. 1 shows a flow chart illustrating a method of displaying related keywords in accordance with the present invention, which includes the following procedure.

Step 101 receives a primary keyword inputted by a user and a request for retrieving keywords related to the primary keyword.

Using a search tool or a search engine, a user may use an input device such as a keyboard or a writing pad to input a primary keyword into a search box or a toolbar. A request for retrieving keywords related to the primary keyword may be subsequently submitted by clicking for confirmation, pressing an "Enter" button, pressing a "Tab" button, or any other triggering method to trigger a local program or a script program of a search page.

Step 102 records a frequency of the request corresponding to the primary keyword.

Preferably, a method of recording the frequency includes the following sub-procedures.

Sub-step A1 creates a table for each Key. Each table includes two pairing fields, Key and Value. The Value is stored in a position pairing with the Key. In the table, the Key is a primary keyword, and the Value is a frequency of a request submitted corresponding to the primary keyword.

Sub-step A2 searches for any matching Key according to the request, and obtains the Value in a position in the table pairing with the matching Key. The Value is then added by one and recorded.

For example, if the Value at the position pairing with the primary keyword in the table is "three (3)", indicating three requests have been made using this primary keyword, the Value is then added by one to become "four (4)" to indicate the updated frequency based on the current request. If no request had been previously made using this primary keyword, the corresponding Value is added by one to become "one (1)" to indicate a frequency of one based on the current request.

The above method of recording is only meant for an illustrative purpose. Any other methods of recording a frequency into a cache may be used and are not described in details herein. For example, a technician in the art may note that a file may be created according to a primary keyword. A frequency that is recorded in the file may be read and added by one, followed by an update of the file. The present invention does not have any limitation on the ways of doing this.

The table may be stored in a server. Preferably, the table is stored in a cache of a server end to reduce resource occupancy of the system and improve processing efficiency of the system.

Step 103 obtains a candidate group of related keywords based on the frequency from the groups of related keywords corresponding to the primary keyword.

Preferably, the groups of related keywords corresponding to the primary keyword are stored in a cache of a server end in order to allow prompt response to the request (particularly under a condition of high concurrency), save resources and space of a server, and improve the processing efficiency of the server, In practical applications, one possible scenario is that the primary keyword and the corresponding related keywords may have already been stored in a database of the server due to the relatively high usage of the primary keyword and the related keywords. In this scenario, one approach to implement the present exemplary embodiment is to retrieve the keywords related to the primary keyword from the database, group these related keywords, and generate and store the groups of related keywords in the cache so that the groups of related keywords of related keywords can be obtained directly from the cache next time when the user submits a request for retrieving the related keywords of the primary keyword. Accordingly, a preferred embodiment which stores groups of related keywords corresponding to a primary keyword into a cache of a server end includes the following sub-procedures.

Sub-step B1 retrieves keywords related to the primary keyword from a database.

Sub-step B2 groups the related keywords to generate groups of related keywords and stores the groups of related keywords into a cache.

In practical applications, another possible scenario is that the database does not have the primary keyword and the corresponding related keywords in advance. Under this situation, one approach to implement the present exemplary embodiment is to obtain related keywords based on the primary keyword, group the related keywords to generate groups of related keywords, and store the groups of related keywords into the database. When the groups of related keywords are needed but cannot be found in the cache, they are retrieved from the database and stored in the cache. Accordingly, another preferred embodiment which stores groups of related keywords corresponding to a primary keyword into a cache of a server end includes the following procedure.

Sub-step C1 obtains keywords related to a primary keyword.

The related keywords may be obtained based on needs or experience. For example, multiple permutations and combinations may be used to obtain keywords related to a primary keyword. The present invention does not have any limitation on the ways to do this.

Sub-step C2 groups the related keywords to generate groups of related keywords and stores the groups of related keywords into a database.

Sub-step C3 retrieves the groups of related keywords corresponding to the primary keyword from the database and stores the groups of related keywords into a cache.

The above methods of storing groups of related keywords are meant for illustrative purposes only. The present invention is not construed to be limited to be limited to these two methods. A technician in the art may apply other methods according to needs or experience. The present invention does not impose any limitation on this.

In practical applications, a preferred exemplary method of generating the groups of relevant keywords includes the following procedure.

Sub-step D1 determines fixed keywords and rotating keywords from the related keywords.

Sub-step D2 pre-establishes at least one group of related keywords corresponding to the primary keyword and adds the fixed keywords and the rotating keywords into the group of related keywords(s).

For example, the number of groups of related keywords to be pre-established, referred to as P, may be obtained based on the following formula:

$$P=((M-N-1)/L)+1;$$

where M is the total number of keywords related to the primary keyword, N is the number of fixed keywords, and L is the number of rotating keywords. In practical applications, N and L may be set based on needs or experience. For example, if M=50, N=10 and L=10, then P=4 (i.e., the number of groups of related keywords to be pre-established is four) based on the above formula. Accordingly, four groups of related keywords are then pre-established for the primary keyword and fixed keywords and rotating keywords are added to each group.

The above method of generating groups of related keywords is meant for illustrative purposes only. The present invention is not construed to be limited to the above method. Any other feasible methods can be used to generate the groups of related keywords and are not described in details herein.

Preferably, the disclosed method may determine fixed keywords and rotating keywords using the following sub-procedures.

Sub-step E1 obtains a level of correlation of each related keyword to the primary keyword.

The method of obtaining a level of correlation may be established based on needs or experience. For example, the level of correlation may be computed based on a frequency of co-occurrence of the primary keyword and a related keyword. Any other available technical method may be used to compute the level of correlation. The present invention does not impose any limitation on ways of doing this.

Sub-step E2 counts a related keyword having a level of correlation above or at a certain threshold to be a fixed keyword.

Sub-step E3 counts a related keyword having a level of correlation lower than the threshold to be a rotating keyword.

In practical applications, fixed keywords refer to those related keywords that are always present in each group of related keywords and are always displayed to a user. An advantage of setting these fixed keywords is to allow the user to obtain recommended items that have a higher level of correlation regardless of which group of related keywords is obtained, thus fitting the user habits better and leading to a better user experience. For instance, a primary keyword "bike" may have ten fixed keywords which are electric bike, mountain bike, e bike, e bicycle, suspension bike, scooter, motorcycle, electric scooter, gas scooter and vehicle. These ten fixed keywords will always be present in each group of related keywords. When a user submits a request for retrieving keywords related to "bike", the above ten fixed keywords will always appear in the group of related keywords that is displayed to the user regardless of which group of related keywords is chosen to be displayed corresponding to the frequency of the retrieving request.

The rotating keywords may be considered as related keywords that are not the fixed keywords. This portion of related keywords may be added into various groups of related keywords according to any arbitrary rule. Preferably, each rotating keyword is ensured to be added into one group of related keywords only. An advantage of doing so is that it may ensure each related keyword to have a chance to be displayed. As a user submits multiple retrieving requests with respect to a certain keyword, a group of related keywords corresponding to the frequency of the retrieving requests is provided each time in a rotating manner to allow the user to obtain related keywords in a simpler and more complete way. For example, the primary keyword "bike" may have rotating keywords motorbike, scooter, motorcycle, electric scooter, exercise bike, vehicle, fitness, auto, mini motor, etc. Therefore, motorbike, scooter, motorcycle and electric scooter may be added to a first group of related keywords, while exercise bike, vehicle, fitness, auto and mini motor may be added to a second group of related keywords. The number of related keywords added into any one group of related keywords may be freely set by according to needs. The present invention imposes no limitation on the ways to do this.

In order to display the groups of related keywords in a rotating manner, one simple method of selecting a candidate group of related keywords is taking the modulus of the frequency of a request with respect to the number of groups of related keywords to obtain a group member for a candidate group of related keywords.

For example, assume that the frequency of a request related to the primary keyword is ten as recorded in the cache, and the number of groups of related keywords is four, the group number to be selected is 10 mod 4=2. That is, the second group of related keywords is selected. Alternatively, a group of related keywords which is second in an order, or a group of related keywords marked as the group number two is selected. The second group of related keywords, or the group of related keywords marked as the group number two may then be selected as the candidate group of related keywords. If the user submits a new request corresponding to the same primary keyword, the frequency of the request becomes eleven while the number of groups is still four. As such, the group number to be obtained is 11 mod 4=3. That is, the third group of related keywords is selected. Alternatively, a group of related keywords which is third in the order, or a group of related keywords marked as group number three will be selected as the candidate group of related keywords. The rule of correspondence between a frequency and a group of related keywords may be arbitrarily set up. Furthermore, the above method of selecting the candidate group is used as an example only. The present invention is not construed to be limited to this method. Any physical method of selecting a group of related keywords to be a candidate group of related keywords based on a rule of using a recorded frequency may be used and is not described in details herein.

Step 104 displays related keywords in the candidate group of related keywords.

The present exemplary embodiment may display related keywords on the present search page, or a search result page, or any other displaying scenario or device. The present invention does not impose any limitation on ways of doing this.

In order to allow better understanding of the present invention, the preferred embodiments of the present invention are further described in details using the examples below.

Figure 2:
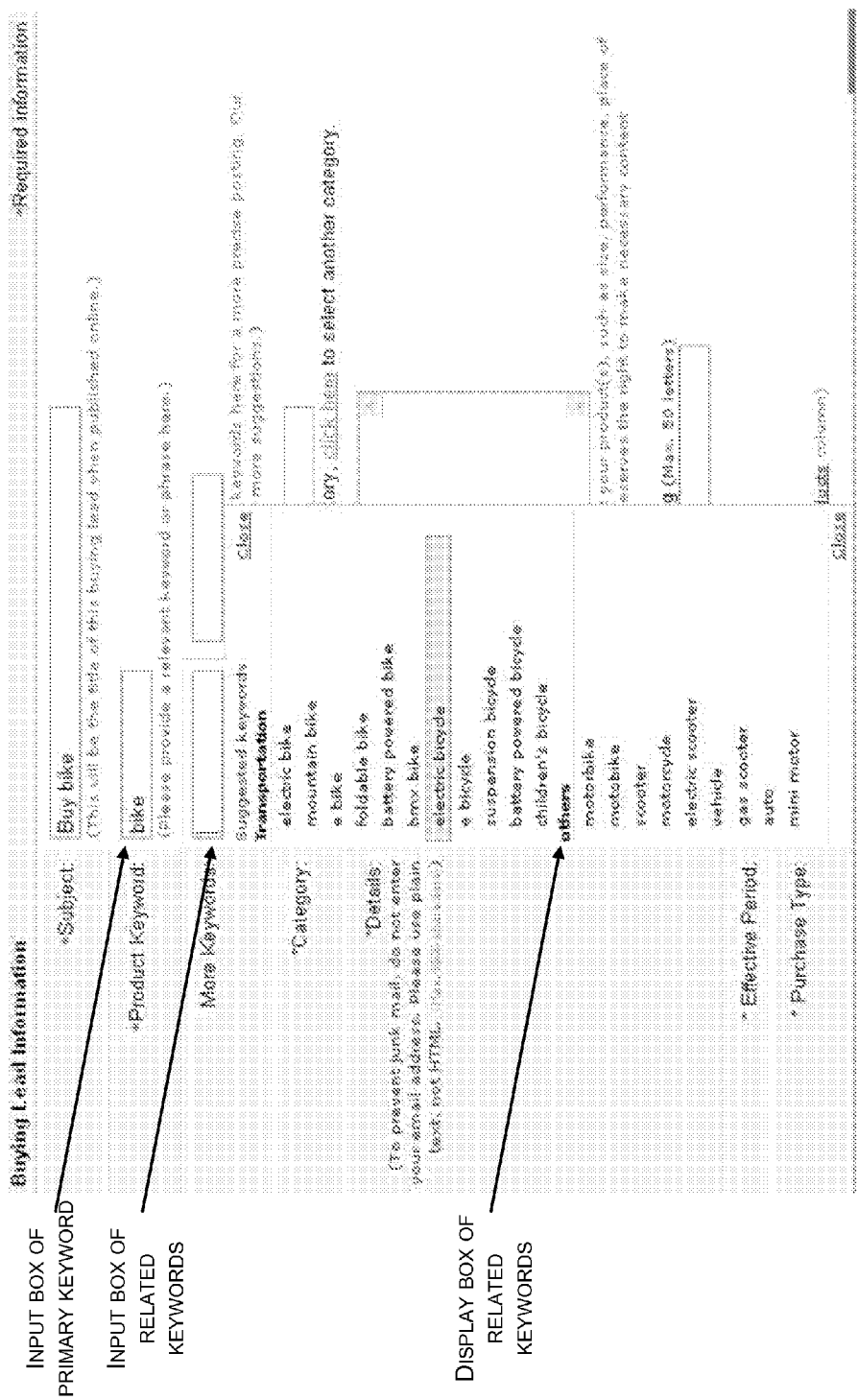
FIG. 2 shows a schematic diagram illustrating a user interface in accordance with the present invention.

FIG. 2 shows a schematic diagram of a user interface in accordance with the present invention. A user enters a primary keyword "bike" in the input box of primary keyword, which is the input box corresponding to Product Keyword field. When a mouse is then moved to the input box of related keywords, which is the input box corresponding to More Keywords field, a local program or a script program of a search page is triggered to submit a request for retrieving keywords related to the primary keyword "bike". Assuming the frequency of the request is three, the third group of related keywords corresponding to the primary keyword may be obtained from the cache to be a candidate group of related keywords. The selection is made based on the frequency of request corresponding to the primary keyword "bike" as recorded in the cache of the server. Fixed related keywords that are stored in this group of related keywords may be: electric bike, mountain bike, e bike, foldable bike, battery powered bike, bmx bike, electric bicycle, e bicycle, suspension bicycle, battery powered bicycle and children's bicycle, while rotating keywords may be motorbike, motorbike, scooter, motorcycle, electric scooter, vehicle, gas scooter, auto and mini motor. Therefore, these fixed keywords and rotating keywords are displayed onto the display box of related keywords.

If the user enters the primary keyword "bike" in the input box of primary keyword again (the input box corresponding to Product Keyword field), and the mouse is moved to the input box of related keywords (the input box corresponding to More Keywords field), the local program or the script program of the search page is triggered to submit another request for retrieving keywords related to the primary keyword "bike". The frequency of the request corresponding to this primary keyword "bike" is thus recorded as four in the cache of the server. Accordingly, the fourth group of related keywords corresponding to the primary keyword is obtained from the cache to be the candidate group of related keywords. The fixed keywords within this group of related keywords are the same as the above fixed keywords, while the rotating keywords therein are different from the previous rotating keywords. After that, by triggering the local program or the script program of the search page to submit additional requests for retrieving keywords related to the primary keyword "bike", other groups of related keywords may be displayed onto the related keyword display box one after another according to the above selection pattern. This allows the user to obtain the related keywords in a simple and more complete way.

Figure 3:
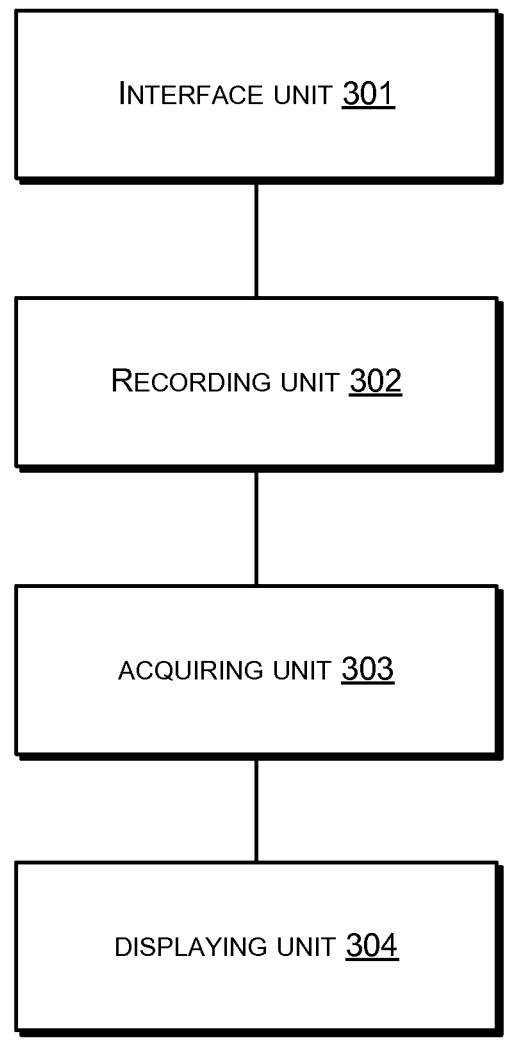
FIG. 3 shows a schematic structural diagram illustrating a system of displaying related keywords in accordance with the present invention.

FIG. 3 shows a schematic structural diagram illustrating a system of displaying related keywords. The system includes the following units:

an interface unit 301, used for receiving a primary keyword inputted by a user and a request for retrieving keywords related to the primary keyword;

a recording unit 302, used for recording a frequency of the request corresponding to the primary keyword;

an acquiring unit 303, used for selecting a candidate group of related keywords based on the frequency from the groups of related keywords corresponding to the primary keyword; and a displaying unit 304, used for displaying related keywords in the candidate group of related keywords.

Preferably, the recording unit 302 may include: a creation sub-unit used for creating a table for each Key and storing a Value in a position pairing with the respective Key, wherein each Key is a primary keyword and each Value is a frequency of request corresponding to respective primary keyword; and a recording sub-unit used for finding a matching Key based on the request, obtaining a Value in a position pairing with the Key in the respective table, and adding a value of one to the Value.

More preferably, the table is stored in a cache of a server end.

Preferably, the groups of related keywords include fixed keywords and rotating keywords. The fixed keywords have a level of correlation above or at a certain threshold. The rotating keywords have a level of correlation lower than the threshold.

Preferably, the exemplary system may further include a storage unit, which is used for storing the groups of related keywords corresponding to the primary keyword.

Preferably, the exemplary system may further include:

a database, used for storing the primary keyword and the corresponding related keywords;

a keyword retrieving unit, used for retrieving the keywords related to the primary keyword from the database; and a grouping unit, used for grouping the related keywords to generate the groups of related keywords.

A process of implementing the present exemplary embodiment is as follows.

Upon receiving a primary keyword inputted by a user through a search tool or search engine, the interface allows a local program or a script program of a search page to be triggered to submit a request for retrieving keywords related to the primary keyword 301, and send information of the frequency of the request to the recording unit 302.

After receiving the frequency of the request, the recording unit 302 records the frequency of the request corresponding to the primary keyword and sends the frequency to the acquiring unit 303.

The acquiring unit 303 obtains a candidate group of related keywords based on the frequency from the groups of related keywords corresponding to the primary keyword, and displays related keywords in the candidate group of related keywords using the displaying unit 304. An exemplary implementation process is shown in FIG. 4.

Figure 4:
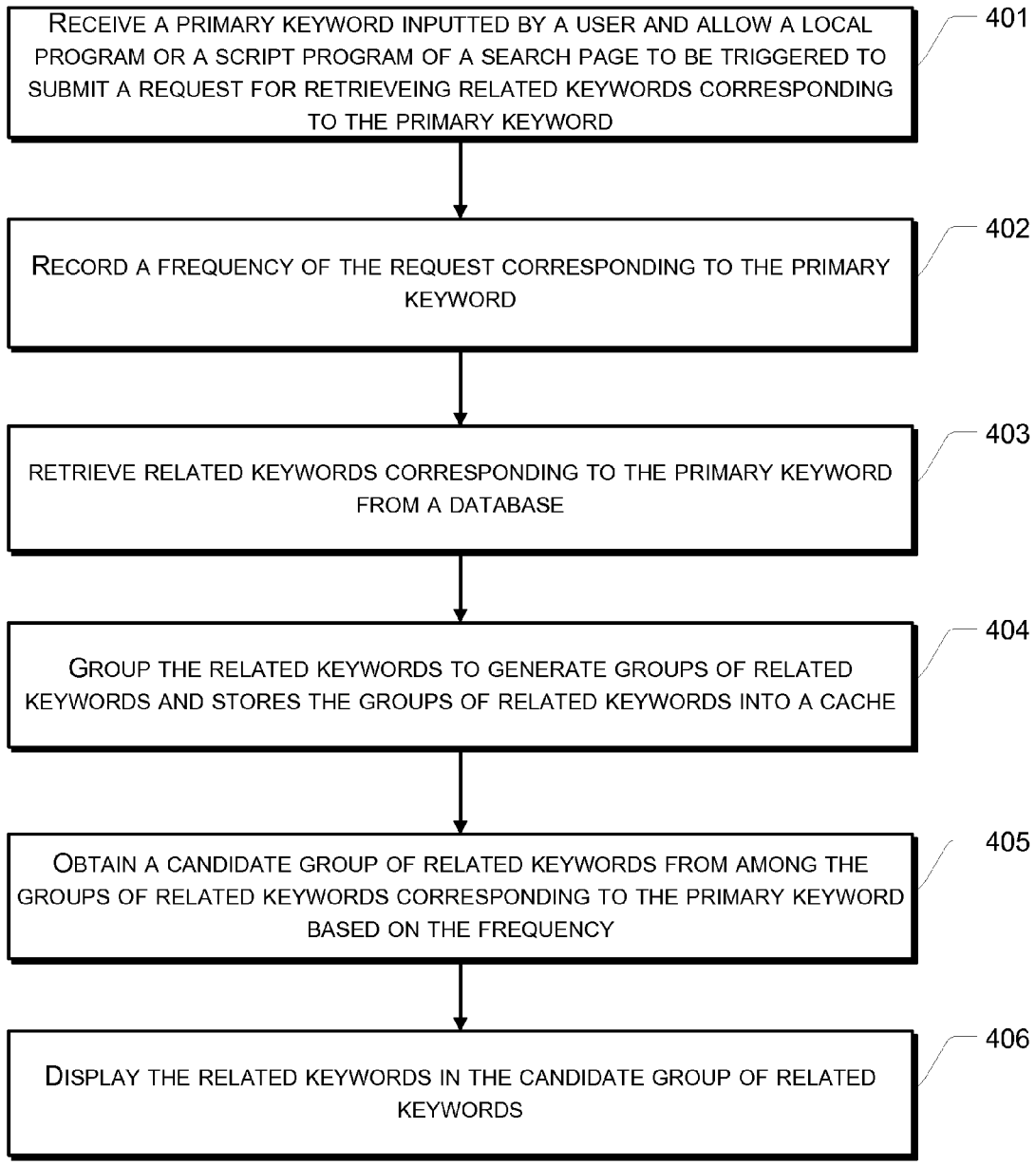
FIG. 4 shows a first exemplary embodiment of the system in FIG. 3.

FIG. 4 shows details of a first exemplary process implementing the system of FIG. 3. The process includes the following procedure.

Step 401 receives a primary keyword inputted by a user and allows a local program or a script program of a search page to be triggered to submit a request for retrieving keywords related to the primary keyword.

Step 402 records a frequency of the request corresponding to the primary keyword.

Step 403 retrieves keywords related to the primary keyword from the database.

Step 404 groups the related keywords to generate groups of related keywords and stores the groups of related keywords into the cache.

Step 405 obtains a candidate group of related keywords from the groups of related keywords corresponding to the primary keyword based on the frequency.

Step 406 displays related keywords in the candidate group of related keywords.

Step 403 and Step 404 may be executed prior to Step 401 and Step 402. The present invention does not impose any limitation on ways of doing this.

Furthermore, besides including an interface unit, a recording unit, an acquiring unit and a displaying unit, the system may further include a database and a group retrieving unit. The database is used for storing a primary keyword and groups of corresponding related keywords. The group retrieving unit is used for retrieving the groups of related keywords corresponding to the primary keyword from the database. Details of this specific process of implementation can be found in FIG. 5.

Figure 5:
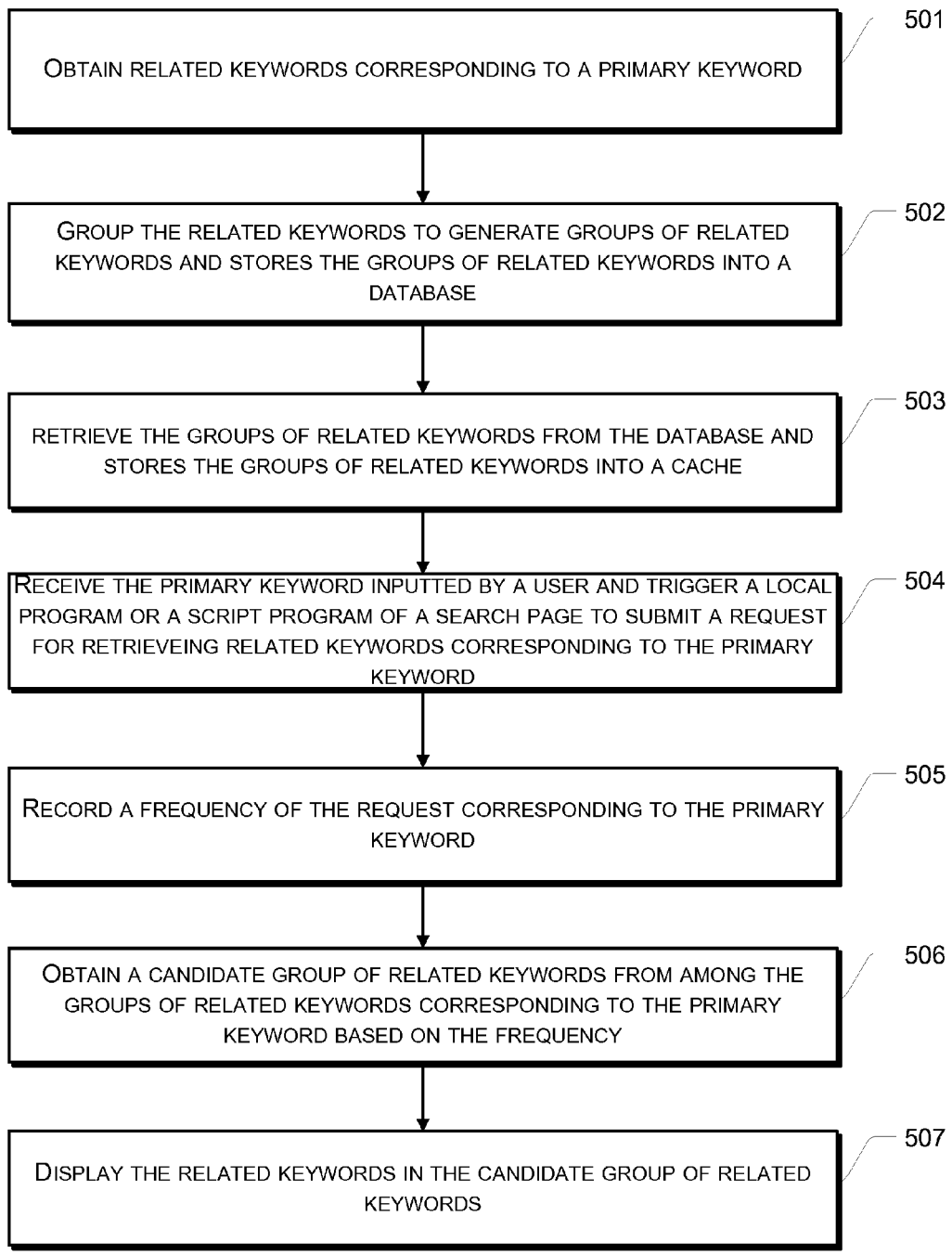
FIG. 5 shows a second exemplary embodiment of the system in FIG. 3.

FIG. 5 shows a second exemplary process implementing the system disclosed in FIG. 3. The process includes the following procedure.

Step 501 obtains keywords related to a primary keyword.

Step 502 groups the related keywords to generate groups of related keywords and stores the groups of related keywords into the database.

Step 503 retrieves the groups of related keywords from the database and stores the groups of related keywords into a cache.

Step 504 receives the primary keyword inputted by a user and allows a local program or a script program of a search page to be triggered to submit a request for retrieving keywords related to the primary keyword.

Step 505 records a frequency of the request corresponding to the primary keyword.

Step 506 obtains a candidate group of related keywords from the groups of related keywords corresponding to the primary keyword based on the frequency.

Step 507 displays related keywords in the candidate group of related keywords.

Step 504 and Step 505 may be executed prior to Step 501 and Step 502. The present invention does not impose any limitations in ways of doing this.

The above exemplary embodiments have different emphases. Any missing details in one exemplary embodiment may be found in the related description of the other exemplary embodiments.

Furthermore, besides an interface unit, a recording unit, an acquiring unit and a displaying unit, the system may further include a database, a keyword retrieving unit and a grouping unit. The database is used for storing a primary keyword and groups of corresponding related keywords. The keyword retrieving unit is used for retrieving the keywords related to the primary keyword from the database. The grouping unit is used for grouping the related keywords to generate the groups of related keywords. Details about a process of implementation are not repeated here.

As the exemplary systems of displaying related keywords disclosed in the present invention may correspond to the foregoing exemplary methods, descriptions of the exemplary systems are relatively brief. Any missing details can be referenced to the descriptions of related portions in the present disclosure.

As illustrated in the exemplary embodiments, the present invention retrieves different groups of related keywords based on the frequency of a request for retrieving keywords related to a certain primary keyword, and displays the related keywords in a rotating manner to allow a user to obtain the related keywords in an easier and more complete way without any additional user operations.

Moreover, by reading data from a cache, the exemplary embodiments of the present invention allows a prompt response to a request. This improves the processing efficiency of a system and saves resources of a server, especially under high concurrency conditions.

Furthermore, the exemplary embodiments of the present invention are suitable for use in various online search engines, local search engines, and various search tools or search websites with no requirement for special display of a web page, and have a low usage requirements and a good user experience.

Finally, from a service provider's perspective, the exemplary embodiments of the present invention require no special secure algorithms and are easy to operate, resulting in a low development cost.

The method and the system of displaying related keywords in the present invention have been described in details above. Exemplary embodiments are employed to illustrate the concept and implementation of the present invention in this disclosure. The exemplary embodiments are only used for better understanding of the method and core concepts of the present invention. Based on the concepts in this disclosure, a technician of ordinary skills in the art may make some modifications. These modifications should also be under scope of the present invention.

The invention claimed is:

1. A method comprising:
under control of one or more processors configured with executable instructions,
receiving a primary keyword inputted by a user and a plurality of requests for retrieving keywords related to the primary keyword received from the user;
recording a frequency at which the plurality of requests for retrieving keywords related to the primary keyword are received from the user;
selecting a candidate group of related keywords from groups of related keywords corresponding to the primary keyword based on the frequency at which the plurality of requests for retrieving keywords related to the primary keyword are received from the user; and displaying related keywords in the candidate group of related keywords.

2. The method as recited in claim 1, further comprising storing the groups of related keywords corresponding to the primary keyword into a cache of a server end.

3. The method as recited in claim 1, further comprising:
retrieving keywords related to the primary keyword from a database;
grouping the retrieved keywords to generate the groups of related keywords; and
storing the groups of related keywords into a cache.

4. The method as recited in claim 1, further comprising:
obtaining the keywords related to the primary keyword;
grouping the related keywords related to the primary keyword to generate the groups of related keywords, and
storing the groups of related keywords into a database;
retrieving the groups of related keywords corresponding to the primary keyword from the database; and
storing the groups of related keywords into a cache.

5. The method as recited in claim 1, further comprising generating the groups of related keywords, the generating comprising:
determining one or more fixed keywords and one or more rotating keywords from the related keywords of the groups; and
adding a fixed keyword of the one or more fixed keywords and a rotating keyword of the one or more rotating keywords into at least one group of related keywords.

6. The method as recited in claim 5, wherein determining the one or more fixed keywords and the one or more rotating keywords from the related keywords of the groups comprises:
obtaining a level of correlation between the primary keyword and each of the one or more related keywords;
counting a first related keyword which level of correlation is greater than or equal to a certain threshold as the one or more fixed keywords; and
counting a second related keyword which level of correlation is less than the certain threshold as the one or more rotating keywords.

7. The method as recited in claim 1, further comprising:
obtaining a plurality of related keywords corresponding to the primary keyword; and
grouping the plurality of related keywords into the groups of related keywords corresponding to the primary keyword.

8. The method as recited in claim 1, further comprising:
receiving a new request for retrieving keywords related to the primary keyword from the user;
selecting a new candidate group of related keywords from the groups of related keywords corresponding to the primary keyword; and
displaying related keywords in the new candidate group of related keywords.

9. A method comprising:
under control of one or more processors configured with executable instructions,
receiving a primary keyword inputted by a user and a plurality of requests for retrieving keywords related to the primary keyword received from the user;
recording a frequency at which the plurality of requests for retrieving keywords related to the primary keyword are received from the user;
selecting a candidate group of related keywords from groups of related keywords corresponding to the primary keyword based at least in part on the frequency at which the plurality of requests for retrieving keywords related to the primary keyword are received from the user; and
providing related keywords in the candidate group of related keywords to a display device for presentation to the user.

10. The method as recited in claim 9, the method further comprising:
storing the groups of related keywords corresponding to the primary keyword.

11. The method as recited in claim 9, the method further comprising:
storing the primary keyword and the related keywords of the groups in a database;
retrieving the related keywords related to the primary keyword from the database; and
grouping the related keywords of the groups to generate the groups of related keywords.

12. The method as recited in claim 9, the method further comprising:
storing the primary keyword and the groups of related keywords in a database; and
retrieving the groups of related keywords corresponding to the primary keyword from the database.

13. The method as recited in claim 9, wherein the recording further comprises:
storing the frequency at which the plurality of requests are received with the primary keyword in a table; and
updating the stored frequency in the table in response to receiving a request for retrieving keywords related to the primary keyword.

14. The method as recited in claim 13, wherein the table is stored in a cache of a server end.

15. The method as recited in claim 9, wherein at least one related keyword corresponding to the primary keyword is included in a subset of less than all of the groups of related keywords.

16. A method comprising:
under control of one or more processors configured with executable instructions,
receiving a primary keyword and a request for retrieving related keywords corresponding to the primary keyword from a user;
obtaining a plurality of related keywords corresponding to the primary keyword;
grouping the plurality of related keywords into a plurality of groups of related keywords, at least one of the plurality of related keywords is included in each of the plurality of groups of related keywords and at least another one of the plurality of related keywords is included in a subset of less than all of the plurality of groups of related keywords;
selecting a candidate group of related keywords from the plurality of groups of related keywords; and
displaying related keywords of the candidate group to the user.

17. The method as recited in claim 16, further comprising:
receiving multiple requests for retrieving related keywords corresponding to the primary keyword from the user; and
updating and recording a frequency at which the multiple requests for retrieving related keywords corresponding to the primary keyword are received from the user, and wherein the selecting comprises selecting the candidate group of related keywords from the plurality of groups of related keywords based on the frequency of receiving the request corresponding to the primary keyword from the user.

18. The method as recited in claim 16, wherein the obtaining comprises obtaining the plurality of related keywords corresponding to the primary keyword from a cache of a server end or a database.

19. The method as recited in claim 16, further comprising:
determining whether a level of correlation between a related keyword of the plurality of related keyword and the primary keyword is greater than or equal to a predefined threshold; and
in response to determining that the level of correlation between the related keyword and the primary keyword is greater than or equal to the predefined threshold, counting the related keyword as one of the at least one of the plurality of related keywords that is included in each of the plurality of groups of related keywords.

20. The method as recited in claim 16, further comprising:
determining whether a level of correlation between a related keyword of the plurality of related keyword and the primary keyword is greater than or equal to a predefined threshold; and
in response to determining that the level of correlation between the related keyword and the primary keyword is less than the predefined threshold, counting the related keyword as one of the at least another one of the plurality of related keywords that is included in the subset less than all of the plurality of groups of related keywords.

\* \* \* \* \*